United States Patent Office

3,702,870
Patented Nov. 14, 1972

3,702,870
FLUORINATED ALCOHOLATES
Allen G. Pittman, El Cerrito, and William L. Wasley, Berkeley, Calif., assignors to the United States of America as represented by the Secretary of Agriculture
No Drawing. Application May 21, 1969, Ser. No. 826,655, now Patent No. 3,637,791, which is a division of application Ser. No. 704,206, Dec. 28, 1967, now Patent No. 3,465,050, which is a division of application Ser. No. 623,483, Jan. 9, 1967, now Patent No. 3,419,602, which in turn is a division of application Ser. No. 398,129, Sept. 21, 1964, now Patent No. 3,384,628. Divided and this application July 9, 1971, Ser. No. 161,310
Int. Cl. C07c 35/02
U.S. Cl. 260—617 R                         2 Claims

ABSTRACT OF THE DISCLOSURE

Fluorinated alcoholates are prepared by reacting a fluoro-ketone with an alkali metal fluoride. The alcoholates may be reacted with acyl halides to produce esters useful for enhancing the water- and oil-repellency of textiles.

---

This is a division of our co-pending application Ser. No. 826,655, filed May 21, 1969, now Pat. 3,637,791, which in turn is a division of Ser. No. 704,206, filed Dec. 28, 1967, now Pat. 3,465,050, which in turn is a division of Ser. No. 623,483, filed Jan. 9, 1967, now Pat. 3,419,602, which in turn is a division of Ser. No. 398,129, filed Sept. 21, 1964, now Pat. 3,384,628.

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

This invention relates to and has among its objects the provision of novel processes for preparing fluorinated compounds, the provision of the products as new compositions of matter, and procedures for treating fibrous materials, especially textiles, with the compounds. Further objects of the invention will be evident from the following description wherein parts and percentages are by weight unless otherwise specified.

In conventional practice, if it is desired to convert a ketone to an ester the following procedure is used: The ketone is reduced to an alcohol and the alcohol is esterified with an acid halide.

Thus: 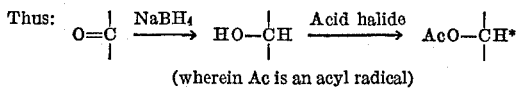

(wherein Ac is an acyl radical)

It is to be particularly observed that the conventional procedure requires a reduction step and that the ester product contains a hydrogen atom on the alpha position of the alcohol moiety. (This hydrogen atom is indicated above by an asterisk.)

In accordance with the invention, fluorinated esters are prepared from ketones. In a first step, the ketone is reacted with an alkali metal fluoride to convert the carbonyl radical of the ketone into an alkali metal fluorocarbinolate radical, that is, a fluorocarbinol group wherein the hydrogen of the hydroxyl radical is replaced by alkali metal. Thus:

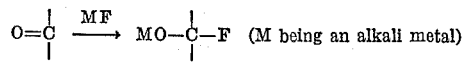 (M being an alkali metal)

Then, the intermediate is reacted with an organic acid halide to form an ester, as follows:

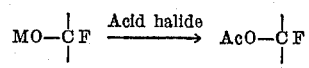

wherein Ac is the acyl radical of an organic acid.

By this simple two-step synthesis, many different kinds of fluorinated esters can be produced in yields as high as 95% of the theoretical. The reactions may be further exemplified by the following formulas which depict the synthesis of heptafluoroisopropyl acrylate from hexafluoroacetone:

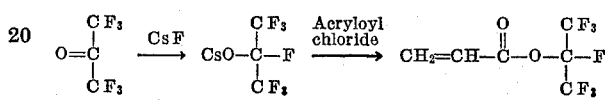

It is evident from the above formulas that the key step in the synthesis is the reaction of the ketone with the alkali metal fluoride. This reaction not only changes the ketone function to an alcohol function without requiring use of a reducing agent, but also adds a fluorine group which carries over to the ester; that is, the ester contains a fluorine group on the alpha carbon atom of the alcohol moiety. This is an unusual type of structure which gives the products especially useful properties. For example, the products can be used to provide oil- and water-repellent finishes on textiles and the repellency attained is substantially greater than that achieved with the corresponding compounds wherein the same position is occupied by hydrogen.

The process of the invention is by no means limited to the example above but is of great versatility and, generically, can be applied to any aliphatic open-chain or closed-chain) ketone which contains at least two fluorine groups adjacent to the carbonyl group. In other words, the carbon atoms connected to the carbonyl group must contain at least two fluorine atoms—distributed on these carbon atoms symmetrically or asymmetrically. These fluorine groups are a critical item to activate the carbonyl group so that it will undergo the desired transformation when contacted with the alkali metal fluoride. Especially good results are obtained when the carbon atoms adjacent to the carbonyl radical contain halogen radicals (i.e., F, Cl, Br, or I) in addition to the minimum of two fluorine groups. In this connection it may be noted that although halogens of higher atomic weight than fluorine—i.e., Cl, Br, and I—are not effective by themselves to activate the carbonyl group, they can be employed to supplement the activating influence of fluorine groups. Beyond the positions adjacent to the carbonyl group, the structure of the ketone is of no criticality to the process and available sites may be occupied, for example, by hydrogen or halogen. In other words, the critical item for the process aspect of this invention is that the starting compound contain a carbonyl group activated by adjacent fluorine atoms as explained hereinabove; the remainder of the starting compound is not material to the process. Of course, this remainder may be limited in accordance with certain parameters to provide particular desired characteristics in the ester products. However, such limitation concerns the character of the ester product, not the operation of the process.

Typical examples of ketones to which the process of the invention may be applied and the corresponding ester products are given below by way of illustration but not limitation:

Wherein R represents an alkyl group containing 1 to 18 cabon atoms or a cycloalkyl group such as cyclopropyl, cyclobutyl, or cyclohexyl.

| Ketone (starting compound) | Ester (product) (Ac is an acyl radical of an organic acid) |
|---|---|
| $CF_3-(CF_2)_n-\overset{O}{\underset{\|}{C}}-(CF_2)_{n'}-CF_3$ | $CF_3-(CF_2)_n-\underset{\|}{\overset{Ac-O}{C}}-(CF_2)_{n'}-CF_3$ |
| Wherein $n$ and $n'$ are each a number from 0 to 10 | |
| $(CF_3)_2CF-\overset{O}{\underset{\|}{C}}-CF(CF_3)_2$ | $(CF_3)_2CF-\underset{F}{\overset{AcO}{C}}-CF(CF_3)_2$ |
| $CF_3-(CF_2)_n-\overset{O}{\underset{\|}{C}}-CF(CF_3)_2$ | $CF_3-(CF_2)_n-\underset{F}{\overset{AcO}{C}}-CF(CF_3)_2$ |
| Wherein $n$ is a number from 0 to 18 | |
| $R-\overset{O}{\underset{\|}{C}}-CF(CF_3)_2$ | $R-\underset{F}{\overset{AcO}{C}}-CF(CF_3)_2$ |
| Wherein R represents the heptafluorocyclobutyl radical | |
| $O=C\ (CF_2)_n$ (ring) | $AcO-C-F\ (CF_2)_n$ (ring) |
| Wherein $n$ is a number from 3 to 10 | |

Compounds containing other halogen atoms in addition to fluorine (Y is Cl, Br, or I)

| Ketone | Ester |
|---|---|
| $YCF_2-\overset{O}{\underset{\|}{C}}-CF_3$ | $YCF_2-\underset{F}{\overset{AcO}{C}}-CF_3$ |
| $YCF_2-\overset{O}{\underset{\|}{C}}-CF_2Y$ | $YCF_2-\underset{F}{\overset{AcO}{C}}-CF_2Y$ |
| $Y_2CF-\overset{O}{\underset{\|}{C}}-CF_2Y$ | $Y_2CF-\underset{F}{\overset{AcO}{C}}-CF_2Y$ |
| $Y_2CF-\overset{O}{\underset{\|}{C}}-CFY_2$ | $Y_2CF-\underset{F}{\overset{AcO}{C}}-CFY_2$ |
| $CF_3-(CF_2)_n-\overset{O}{\underset{\|}{C}}-CF_2Y$ | $CF_3-(CF_2)_n-\underset{F}{\overset{AcO}{C}}-CF_2Y$ |
| Wherein $n$ is a number from 0 to 18 | |
| $CF_3-(CF_2)_n-\overset{O}{\underset{\|}{C}}-CFY_2$ | $CF_3-(CF_2)_n-\underset{F}{\overset{AcO}{C}}-CFY_2$ |
| Wherein $n$ is a number from 0 to 18 | |

Compounds containing hydrogen in addition to fluorine ($n$ and $n'$ are each a number from 1 to 18)

| Ketone | Ester |
|---|---|
| $H(CF_2)_n-\overset{O}{\underset{\|}{C}}-(CF_2)_{n'}H$ | $H(CF_2)_n-\underset{F}{\overset{AcO}{C}}-(CF_2)_{n'}H$ |
| $H(CF_2)_n-\overset{O}{\underset{\|}{C}}-(CF_2)_{n'}F$ | $H(CF_2)_n-\underset{F}{\overset{AcO}{C}}-(CF_2)_{n'}F$ |
| $H(CF_2)_n-\overset{O}{\underset{\|}{C}}-CF(CF_3)_2$ | $H(CF_2)_n-\underset{F}{\overset{AcO}{C}}-CF(CF_3)_2$ |
| $R-\overset{O}{\underset{\|}{C}}-C_nF_{2n+1}$ | $R-\underset{F}{\overset{AcO}{C}}-C_nF_{2n+1}$ |

It is also within the broad scope of the invention to utilize, as the starting material, ketones containing more than one carbonyl group. By adjustment of the proportions of reactants in line with usual stoichiometrical relationships, diesters are produced. Typical in this category are the following:

| Ketone | Ester (Ac is acyl group of an organic acid) |
|---|---|
| $(CF_3)_2CF-\overset{O}{\underset{\|}{C}}-\overset{O}{\underset{\|}{C}}-CF(CF_3)_2$ | $(CF_3)_2CF-\underset{\underset{F}{\|}}{\overset{\overset{AcO}{\|}}{C}}-\underset{\underset{F}{\|}}{\overset{\overset{OAc}{\|}}{C}}-CF(CF_3)_2$ |
| $(CF_3)_2CF\overset{O}{\underset{\|}{C}}-(CF_2)_3-\overset{O}{\underset{\|}{C}}-CF(CF_3)_2$ | $(CF_3)_2CF\underset{\underset{F}{\|}}{\overset{\overset{AcO}{\|}}{C}}-(CF_2)_3-\underset{\underset{F}{\|}}{\overset{\overset{AcO}{\|}}{C}}-CF(CF_3)_2$ |

Generically, a preferred class of ketones which may be used in the process of the invention and the intermediates and the esters formed therefrom may be represented by the following structures:

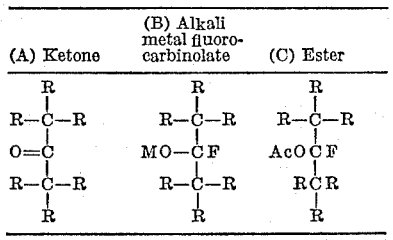

| (A) Ketone | (B) Alkali metal fluoro-carbinolate | (C) Ester |
|---|---|---|

Wherein each R represents a member of the group consisting of hydrogen, halogen, alkyl, haloalkyl, cycloalkyl, and halocycloalkyl and wherein at least two of the R's are fluorine. Ac represents an acyl radical of an organic acid. M represents an alkali metal.

The fluorocarbinolates and the esters responding to the structure given above in columns B and C are new compounds, not heretofore prepared or described.

As noted above, in the first step of the synthesis the fluoroketone is reacted with an alkali metal fluoride. As the latter reagent, potassium fluoride is generally preferred, but the fluorides of sodium, cesium, and rubidium may also be used. The reaction is generally conducted in an inert solvent for the ketone, for example, acetonitrile, dioxane, tetrahydrofuran, tetramethylene sulphone, diglyme (an abbreviated name for dimethyl ether of diethylene glycol), etc. The alkali metal fluoride is only slightly soluble in these solvents and the disappearance of undispersed alkali metal fluoride during the reaction supplies a useful indication of formation of the desired intermediate (which is soluble). The temperature of reaction is not critical. Generally, temperatures over 35° C. are avoided to prevent decomposition of the intermediate. Usually, the reaction is conducted at room temperature for convenience but it does not take place at much lower temperatures. Where the starting ketone is a gas (for example, hexafluoroacetone) it is preferred to cool the system first to get the ketone into solution. Then, the temperature can be increased—for example, allowed to warm to room temperature—to accelerate the reaction. To prevent hydrolysis of the intermediate, the reaction is conducted under anhydrous conditions. It is also helpful to remove air (which may contain moisture) by flushing the reaction vessel with dry, inert gas such as nitrogen. When the intermediate is formed—as evidenced by disappearance of undissolved alkali metal fluoride—the system is ready for further treatment. Where the intermediate (the fluorocarbinolate) is intended as the product, it is isolated from the reaction system by evaporating the solvent therefrom under vacuum. Where it is desired to produce an ester, the intermediate is not isolated but employed just as it is formed. The esterification is accomplished simply by adding the desired acid halide and stirring the mixture. The temperature is not critical and may range, for example, from 0 to 35° C. No novelty is claimed, per se, in this esterification—it is analogous to conventional esterification by reacting an acid halide with an alcoholate.

The ester is recovered from the system by adding water and separating the organic phase from the aqueous phase containing dissolved alkali metal salt. The organic phase may then be dried and the product separated by distillation. In the alternative, the reaction mixture may be filtered to remove alkali metal salt and the product isolated by distillation.

In the esterification step, one can use any desired acid halide. Typically, the acid halide may be a carbonyl halide, a sulphonyl halide, or a haloformate. Compounds which may be used are listed below by way of illustration and not limitation:

Unsaturated acid halides, for example, compounds of the type:

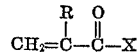

wherein X is F, Cl, Br, or I and R is H or a lower alkyl radical.

Saturated acid halides, for example, compounds of the type:

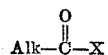

wherein X is F, Cl, Br, or I and Alk is an alkyl radical containing one to 18 carbon atoms.

Aromatic acid halides, for example, benzoyl, toluyl, xyloyl, naphthoyl, anisoyl, dodecylbenzoyl, parachlorobenzoyl, nitrobenzoyl, 2,4-dichlorobenzoyl, etc. fluorides, chlorides, bromides, or iodides.

Fluorinated acid halides, for example, compounds of the type:

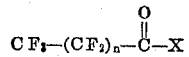

wherein X is F, Cl, Br, or I and n has a value from 0 to 18.

Other carbonyl halides such as phenylacetyl chloride, ethoxyacetyl chloride, crotonyl chloride, hexahydrobenzoyl chloride, nitrobenzoyl chloride, acetyl-benzoyl chloride, oleoyl chloride, linoleoyl chloride, chloroacetyl chloride, cinnamyl chloride, phenoxyacetyl chloride, etc.

Aromatic sulphonyl halides, for example, benzene, toluene, xylene, naphthalene, anisole, phenetole, dodecylbenzene, nitrobenzene, parachlorobenzene, 2,4-dichlorobenzene, α-toluene, etc. sulphonyl fluorides, chlorides, bromides, or iodides.

Saturated aliphatic sulphonyl halides, for example, compounds of the type:

wherein X is F, Cl, Br, or I and $n$ has a value from 0 to 18.

Fluorinated aliphatic sulphonyl halides, for example, compounds of the type:

$$CF_3-(CF_2)_n-SO_2X$$

wherein X is F, Cl, Br, or I and $n$ has a value from 0 to 18.

Unsaturated sulphonyl halides, for example, compounds of the type:

$$CH_2=\underset{\underset{R}{|}}{C}-SO_2X$$

wherein X is F, Cl, Br or I and R is H or a lower alkyl group.

Other sulphonyl halides, for example, cyclohexane sulphonyl chloride, benzyl sulphonyl chloride, etc.

Saturated haloformates, for example, compounds of the type:

$$Alk-O-\overset{O}{\underset{||}{C}}X$$

wherein X is F, Cl, Br, or I and Alk is an alkyl radical containing one to 18 carbon atoms.

Aromatic haloformates, for example, compounds of the type:

$$Ar-O-\overset{O}{\underset{||}{C}}X$$

wherein X is F, Cl, Br or I and Ar is an aryl radical such as phenyl, tolyl, xylyl, naphthyl, etc.

Fluorinated haloformates, for example, compounds of the types:

$$HCF_2-(CF_2)_n-CH_2-O-\overset{O}{\underset{||}{C}}-X$$

$$CF_3-(CF_2)_n-CH_2-O-\overset{O}{\underset{||}{C}}-X$$

wherein X is F, Cl, Br or I and $n$ has a value from 0 to 18.

Unsaturated haloformates, typically compounds of the types:

$$CH_2=\underset{\underset{R}{|}}{C}-\overset{O}{\underset{||}{C}}-O-CH_2-CH_2-O\overset{O}{\underset{||}{C}}X$$

$$CH_2=\underset{\underset{R}{|}}{C}-\overset{O}{\underset{||}{C}}-O-CH_2-CH_2-O\overset{O}{\underset{||}{C}}X$$

$$CH_2=CH-O\overset{O}{\underset{||}{C}}X$$

wherein X is F, Cl, Br, or I and R is H or a lower alkyl radical.

Although it is generally preferred to utilize monofunctional acid halides in the esterification, it is within the broad ambit of the invention to use polyfunctional agents, for example, maleyl chloride, malonyl chloride, succinyl chloride, adipyl chloride, itaconyl chloride, benzene disulphonyl chloride, ethylene glycol bis-chloroformate, diethylene glycol bis-chloroformate, the bischloroformate of 2,2-bis-(parahydroxyphenyl)propane, and the like. Where polyfunctional acid halides are employed, the proportions of the acid halide and the above-described intermediate may be selected to attain complete or partial esterification of the available acid halide sites.

The alkali metal fluorocarbinolates produced in accordance with the invention are primarily useful as intermediates for the preparation of esters as herein disclosed.

The esters produced in accordance with the invention may be used in many areas wherein esters in general are employed, i.e., as lubricants, plasticizers, and hydraulic fluids. Moreover, because of their content of fluorine, particularly the fluorine atom on the $\alpha$-carbon atom of the alcohol moiety, they are useful in such applications as oil and water repellents. Thus, by applying solutions of these esters to materials such as paper, fabrics, yarns, etc., these materials will resist the penetration of oils and water. Of particular utility are the esters derived from acrylic, methacrylic, or other acids containing a $CH_2=C<$ group. These esters are polymerizable and can be formed into homopolymers or copolymers by conventional polymerization techniques as, for example, heating at about 70–85° C. in the presence of a small proportion of a polymerization initiator such as $\alpha,\alpha'$-azobisisobutyronitrile. These novel polymers can be used in such applications as coating and as adhesives in laminating sheet materials. Of especial interest is that the polymers exhibit low solubility in common solvents such as benzene, toluene, xylene, etc., whereas they are soluble in fluorinated solvents such as benzotrifluoride, 1,3-bis-trifluoromethyl benzene, and the like. Thus, the polymers in question can be used in coating and adhesive applications where other polymeric materials are unsuitable because of solubility in common organic solvents.

A particular phase of the present invention is concerned with the treatment of fibrous materials, such as textiles, in order to improve their properties, e.g., to improve their oil- and water-repellency. In applying this phase of the invention, an ester derived from acrylic acid, methacrylic acid, or other organic acid containing a $CH_2=C<$ group is prepared as hereinabove described. This polymerizable ester is then applied to the fibrous material, using either of two procedures. In one procedue the monomeric ester is applied to the fibrous material and polymerized in situ thereon by applying ionizing radiation, a persulphate, a peroxide, an azo polymerization initiator, or a redox catalyst system (typically, a combination of a reducing agent such as hydrazine sulfate, ferrous sulphate, sodium bisulphite, etc., and an oxidizing agent such as hydrogen peroxide, benzoyl peroxide, sodium peracetate, etc.). In the preferred procedure, the polymerizable ester is first formed into a polymer and then applied to the fibrous material. The polymer may be a homopolymer, that is, one consisting of recurring units of the ester, or it may be a copolymer, that is, a polymer containing recurring units of the ester interspersed with units derived from a different vinyl monomer, such as ethylene, propylene, styrene, vinyl chloride, acrylonitrile, methyl methacrylate or acrylate, acrylamide, mathacrylamide, vinyl acetate or stearate, butadiene, and the like. The polymers are prepared by conventional techniques. For example, the polymerizable ester per se or admixed with a different vinyl monomer is heated at about 70–85° C. in the presence of a small proportion of a polymerization initiator such as $\alpha,\alpha'$-azobisisobutyronitrile. As illustrative examples of this procedure, when heptafluoroisopropyl acrylate is formed into a homopolymer, the product will be a polymer containing in its skeletal chain recurring units of the structure:

$$-CH_2-CH-\\ \underset{\underset{\underset{\underset{CF_3-CF-CF_3}{|}}{O}}{\underset{||}{C=O}}}{}$$

In the event that the same ester is copolymerized with butyl acrylate, for example, the copolymer product will contain in its skeletal chain recurring units of the above type plus recurring units derived from butyl acrylate, i.e.

$$-CH_2-CH-\\ \underset{\underset{\underset{C_4H_7}{|}}{\underset{|}{O}}}{\underset{||}{C=O}}$$

In any event, the polymers (homo- or co-polymers) are applied to the fibrous material in conventional manner. Typically, the polymer is dissolved in an inert, volatile solvent—for example, benzotrifluoride or 1,3-bis-trifluorobenzene—and the resulting solution applied to the fibrous material by a conventional dip and pad technique. By varying the concentration of polymer in solution and the degree of padding, the amount of polymer deposited on the material may be varied. Typically, the amount of polymer may be about from 0.1 to 20%, based on the weight of fibrous material but it is obvious that higher or lower proportions can be used if desired. Usually, in treating textiles such as fabrics the amount of polymer is limited to about 0.1 to 10% to attain the desired repellency improvement without interference with the hand of the textile. Generally, it is preferred to subject the fibrous material to a conventional curing operation after application of the polymer solution thereto in order to bond the polymer to the fibers. As an example of such treatment, the fibrous material is heated in the range of about 50 to 150° C. for a period of about 5 to 30 minutes. The solvent (from the polymer solution) may be evaporated in a separate step prior to curing or may be simply evaporated during the curing operation. Fibrous materials treated with the polymers of the invention display an increased resistance to becoming soiled because they repel both water- and oil-borne soils and stains. Moreover, the improvements so rendered are durable—they are retained despite laundering and dry-cleaning of the product.

The invention may be utilized for improving the properties of all types of fibrous materials, for example, paper, cotton; linen; hemp; jute; ramie; sisal; cellulose acetate rayons; cellulose acetate-butyrate rayons; saponified acetate rayons; viscose rayons; cuprammonium rayons; ethyl cellulose; fibers prepared from amylose, algins, or pectins; wool; silk; animal hair; mohair; leather; fur; regenerated protein fibers prepared from casein, soybean, peanut proteins, zein, gluten, egg albumin, collagen, or keratins; nylon; polyurethane fibers; polyester fibers such as polyethylene terephthalate; polyacrylonitrile-based fibers; or fibers of inorganic origin such as asbestos, glass, etc. The invention may be applied to textile materials which are in the form of bulk fibers, filaments, yarns, threads, slivers, roving, top, webbing, cord, tape, woven or knitted fabrics, felts or other non-woven fabrics, garments or garment parts.

Included in the invention is the process which comprises reacting a ketone of the structure

wherein $n$ is a number from 3 to 10, with an alkali metal fluoride to produce an intermediate of the structure

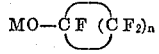

wherein $n$ is as defined above and M is an alkali metal, and reacting said intermediate with an organic acid halide to produce an ester of the structure

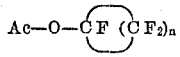

wherein Ac is the acyl radical of an organic acid and $n$ is as defined above.

EXAMPLES

The invention is further demonstrated by the following illustrative examples. The various tests described in the examples were carried out as described below:

Oil Repellency: The 3M oil repellency test described by Grajeck and Peterson, Textile Research Journal, 32, pages 320–331, 1962. Ratings are from 0 to 150, with the higher values signifying the greater resistance to oil penetration.

Water Repellency: AATC spray test, method 22–1952. Ratings are from 0 to 100 with the higher values signifying greater resistance to water penetration.

Home Laundering Procedure: An agitator-type home washing machine was operated under the following conditions: Low water level (about 11 gal.); wash temperature, 115–125° F.; rinse temperature, 95–115° F.; normal agitation; 12-minute wash cycle; load—2 pounds ballast plus samples, total weight not exceeding 4 pounds; 100 cc. "Tide" detergent. Washed samples were dried 15 minutes in a forced draft oven at 160° F.

EXAMPLE 1

Preparation of heptafluoroisopropyl acrylates

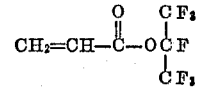

An apparatus was assembled including a 3-neck flask equipped with thermometer, stirrer, and a reflux condenser cooled with Dry Ice (solid $CO_2$). The open end of the condenser was connected to a drying tube to prevent ingress of moisture from the air. The system was flushed with nitrogen, then 76 g. (0.5 mole) dry cesium fluoride and 200 ml. dry diglyme were placed in the flask and mixed. The dispersion was cooled to minus 40° C. by applying a Dry-Ice cooling bath to the flask, and 84 grams (0.506 mole) of hexafluoroacetone was introduced into the flask. The cooling bath was then removed and the system allowed to come to room temperature. As the system warmed, formation of the fluorocarbinolate intermediate was evidenced by disappearance of the dispersed CsF, giving a homogeneous solution.

Acryloyl chloride (41 g., 0.45 mole) was then added with stirring. A precipitate formed immediately. Stirring was continued at room temperature for ½ hour.

The mixture was poured into 3 volumes of water. The lower phase was collected, washed three times with 100-ml. portions of water. Eighty-six grams of crude product was obtained. The product was dried over calcium sulphate, and distilled in vacuo through a short Vigreux column. Seventy-eight grams of purified product—heptafluoroisopropyl acrylate—was collected as a clear liquid, B.P. 75.5° C. at 760 mm. of Hg. Calculated for $C_6F_7H_3O_2$ (percent): C, 29.99; F, 55.5; H, 1.25. Found (percent): C, 29.42; F, 56.2; H, 1.77.

EXAMPLE 2

Preparation of polymer of heptafluoroisopropyl acrylate

A 4-gram sample of the ester prepared in Example 1 and 100 mg. of $\alpha,\alpha'$-azobisisobutyronitrile were heated at 78° C. for 3 hours in a sealed vessel. The polymer was a tacky, colorless solid, soluble in benzotrifluoride and 1,3-bis-trifluoromethyl benzene.

EXAMPLE 3

Preparation of heptafluoroisopropyl methacrylate

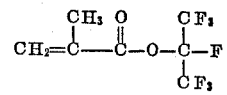

The procedure of Example 1 was repeated, using methacryloyl chloride in place of acryloyl chloride. A 70% yield of heptafluoroisopropyl methacrylate was obtained as a clear liquid, B.P. 85–86° C. at 760 mm.

EXAMPLE 4

Preparation of polymer of heptafluoroisopropyl methacrylate

A 4-gram sample of the ester prepared in Example 3 and 100 mg. of $\alpha,\alpha'$-azobisisobutyronitrile were heated at 78° C. for 3 hours in a sealed vessel. The polymer was a glassy, brittle resin, soluble in benzotrifluoride and 1,3-bis-trifluoromethyl benzene.

EXAMPLE 5

Preparation of heptafluoroisopropyl acetate

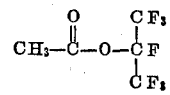

The procedure of Example 1 was followed, substituting acetyl bromide for the acryloyl chloride. The amounts of material used were:

Cesium fluoride: 40 g., 0.26 mole
Hexafluoroacetone: 44 g., 0.26 mole
Diglyme (solvent): 100 ml.
Acetyl bromide: 19.6 ml., 0.26 mole The product, heptafluoroisopropyl acetate, was obtained as a clear liquid in a yield of 32 grams, B.P. 65–66° C. at 760 mm. Hg.

EXAMPLE 6

Preparation of heptafluoroisopropyl propionate

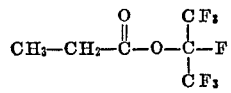

The procedure of Example 1 was repeated, using the following materials:

Potassium fluoride: 6.6 g., 0.114 mole
Diglyme (solvent): 50 ml.
Hexafluoroacetone: 18.8 g., 0.113 mole
Propionyl chloride: 9 ml., 0.113 mole The product, heptafluoroisopropyl propionate, was obtained in a yield of 35% as a clear liquid, B.P. 83–84° C. at 760 mm. Hg.

EXAMPLE 7

Preparation of β-chloro-hexafluoroisopropyl acrylate

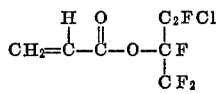

Using the apparatus described in Example 1, 100 ml. of diglyme and 31.3 grams of cesium fluoride were cooled to about minus 40° C. and 37.5 g. of monochloropentafluoroacetone ($CF_3$—CO—$CF_2Cl$) were added. The system was allowed to warm to room temperature and when the solution had cleared, 14.9 ml. of acryloyl chloride was added and the system stirred for a half-hour. The ester product was isolated in the same manner as described in Example 1. Yield, 20 grams, B.P. 112–113° C. at 760 mm. Hg.

EXAMPLE 8

Polymer of β-chloro-hexafluoroisopropyl acrylate

A 3-gram sample of the acrylate prepared in Example 7 and 50 mg. of α,α'-azobisisobutyronitrile were heated at 78° C. for 3 hours in a sealed vessel. The polymer was a glassy solid which softened at about 85° C. and which was soluble in benzotrifluoride and 1,3-bis-trifluoromethyl benzene.

EXAMPLE 9

Preparation of β-chloro-hexafluoroisopropyl methacrylate

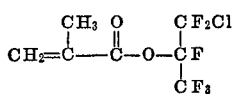

The procedure of Example 7 was repeated, substituting the equivalent amount of methacryloyl chloride for the acryloyl chloride.

The ester product was recovered in a yield of 32 grams, B.P. 123–124° C. at 760 mm. Hg.

EXAMPLE 10

Polymer of β-chloro-hexafluoroisopropyl methacrylate

A 4-gram sample of the ester prepared in Example 9 and 100 mg. of α,α'-azobisisobutyronitrile were heated at 78° C. for 3 hours in a sealed vessel. The polymer was a glassy, brittle solid which softened at about 100° C. It was soluble in benzotrifluoride and 1,3-bis-trifluoromethyl benzene.

EXAMPLE 11

Preparation of β,β'-dichloro-pentafluoroisopropyl methacrylate

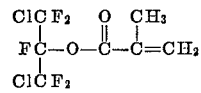

Cesium fluoride (30.4 g., 0.2 mole) was dispersed in 100 ml. diglyme and the dispersion was cooled to 0° C. 1,3-dichlorotetrafluoroacetone (40 g., 0.2 mole) was added with stirring and the mixture allowed to warm to room temperature. After the mixture had cleared, 20 g. of methacryloyl chloride was added and stirring was continued for ½ hour at room temperature.

The mixture was poured into 3 volumes of water and the lower layer separated, washed with water, dried, and distilled, giving a 32% yield (18 g.) of β,β'-dichloro-pentafluoroisopropyl methacrylate, B.P. 156–157° C. at 760 mm. Hg.

EXAMPLE 12

Polymer of β,β'-dichloro-pentafluoroisopropyl methacrylate

A 4-gram sample of the ester prepared in Example 11 and 75 mg. of α,α-azobisisobutyronitrile were heated at 80° C. for 4 hours in a sealed vessel. The polymer was a hard, brittle solid. It was soluble in benzotrifluoride and 1,3-bis-trifluoromethyl benzene.

EXAMPLE 13

Preparation of β,β'-dichloro-pentafluoroisopropyl acrylate

The procedure of Example 11 was repeated, substituting the equivalent amount of acryloyl chloride for the methacryloyl chloride. The ester product was obtained in a yield of 32 grams, B.P. 145.5° C. at 760 mm. Hg.

EXAMPLE 14

Polymer of β,β'-di-chloro-pentafluoroisopropyl acrylate

A 4-gram sample of the ester prepared in Example 13 and 75 mg. of α,α'-azobisisobutyronitrile were heated at 80° C. for 4 hours in a sealed vessel. The polymer was an amorphous, clear solid. It was soluble in benzotrifluoride and 1,3-bistrifluoromethyl benzene.

EXAMPLE 15

Preparation of acrylic acid ester of perfluoroheptan-4-ol

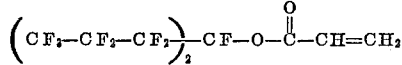

Cesium fluoride (10.9 g. 0.072 mole) was dispersed in 50 ml. diglyme and the dispersion cooled to 0° C. Perfluoroheptan-4-one (26.5 g., 0.072 mole) was added with stirring. After formation of the intermediate, 6.48 g. of acryloyl chloride was added and stirring was continued for ½ hour at room temperature.

The mixture was poured in 3 volumes of water and the lower layer separated, washed with water, dried, and distilled. The product, having the formula given above, was obtained in a 30-gram yield, B.P. 167° C. at 760 mm. Hg.

The product was polymerized in the following manner:

A 4-gram sample of the acrylate and 75 mg. of α,α'-azobisisobutyronitrile were heated at 80° C. for 4 hours in a sealed vessel. The polymer was a glassy, amorphous solid. It was soluble in benzotrifluoride and 1,3-bis-trifluoromethyl benzene.

EXAMPLE 16

Preparation of β-chloro-hexafluoroisopropyl benzenesulphonate

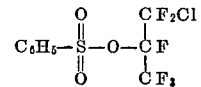

Using the procedure described in Example 1, the following materials were applied to the reaction:

Cesium fluoride: 37 grams
Diglyme (solvent): 100 ml.
Monochloro-pentafluoroacetone: 45 grams
Benzene sulphonyl chloride: 30.4 cc.

The product was obtained in a yield of 45 grams, B.P. about 240° C. at 760 mm. Hg.

EXAMPLE 17

(A) Preparation of $$CH_2=C(CH_3)-C(O)-O-CH_2CH_2-O-C(O)-O-CF(CF_3)_2$$

Using the procedure of Example 1, the following materials were applied to the reaction:

Potassium fluoride: 1.7 grams
Diglyme (solvent): 25 ml.
Hexafluoroacetone: 5 grams
Chloroformate of ethylene glycol mono-methacrylate:

$$(CH_2=C(CH_3)-C(O)-O-CH_2CH_2-O-C(O)Cl)\ 5.8\ \text{grams}$$

The product was obtained in a yield of 6 grams, B.P. 105° C. at 1.5 mm. Hg. (B) Preparation of polymer: A portion (5 grams) of the carbonate ester prepared as described above was dissolved in 5 ml. of benzotrifluoride and 75 mg. of α,α'-azobisisobutyronitrile was added as a polymerization initiator. The solution was heated in a closed vessel at 80° C. for 6 hours, thereby producing a polymer of the carbonate ester, the polymer remaining in solution in the solvent.

EXAMPLE 18

Oil- and water-repellency of polyacrylates

Polymers prepared as described above were dissolved in trifluoromethyl benzene. Solutions ranging in concentration from ½ to 8% were prepared for each polymer. These solutions were then applied to samples of wool fabric by the following method:

The cloth was immersed in the solution to thoroughly wet the cloth with the liquid. Then, the cloth was passed through squeeze rolls to provide a wet pick-up of about 100%. The treated fabric was then cured in a forced-draft oven at 110° C. for 20 minutes. After curing, the samples were weighed to determine the amount of polymer on the fabric.

The fabric samples were then subjected to tests for oil- and water-repellency. The results are tabulated below:

OIL- AND WATER-REPELLENCY TESTS

Polymers of $CH_2=CH-C(O)-OR$

| R | Weight of polymer on fabric, percent | Oil repellency | Water repellency |
|---|---|---|---|
| $-CF(CF_3)_2$ | 6.5 | 110 | 100 |
| $-CF(CF_3)_2$ | 3.2 | 100 | 100 |
| $-CF(CF_3)_2$ | 1.6 | 100 | 100 |
| $-CF(CF_3)_2$ | 0.8 | 100 | 100 |
| $-CF(CF_3)_2$ | 0.4 | 90 | 100 |
| $-CF(CF_3)(CF_2Cl)$ | 5.8 | 100 | 100 |
| Same as above | 2.6 | 100 | 100 |
| Do | 1.3 | 90 | 100 |
| Do | 0.65 | 80 | 100 |
| $-CF(CF_2Cl)_2$ | 7.3 | 0 | 100 |
| $-CF(CF_2Cl)_2$ | 4.1 | 0 | 100 |
| $-CF(CF_2Cl)_2$ | 2.0 | 0 | 100 |
| $-CF(CF_2Cl)_2$ | 1.0 | 0 | 100 |
| Control (untreated wool) | 0 | 0 | 50-60 |

It is evident from the above data that all the polymers provided good water repellency. With regard to oil repellency, the polymer of heptafluoroisopropyl acrylate provided the best results, whereas replacement of two fluorine groups by chlorine vitiated the oil-repellent character.

EXAMPLE 19

Durability to laundering of poly-heptafluoroisopropyl acrylate

The wool samples treated with poly-heptafluoroisopropyl acrylate as described in Example 18 were tested for oil- and water-repellency as initially prepared and after repeated washing by the home laundering procedure described hereinabove. The results are tabulated below:

| | Oil repellency | | | Water repellency | | |
|---|---|---|---|---|---|---|
| Weight [1] | Initial | After 3 washes | After 6 washes | Initial | After 3 washes | After 6 washes |
| 6.5 | 110 | 110 | 110 | 100 | 100 | 100 |
| 1.6 | 100 | 90 | 90 | 100 | 100 | 100 |
| 0.8 | 100 | 80 | 60 | 100 | 100 | 90 |
| None (control) | 0 | | | 50-60 | | |

[1] Polyheptafluoroisopropyl acrylate on fabric, percent.

EXAMPLE 20

Water repellency of poly-methacrylates

Samples of wool cloth were treated with solutions of polymethacrylates as described above in Example 18. The water repellency of the products is tabulated below:

WATER-REPELLENCY TESTS

Polymers of $CH_2=C(CH_3)-C(O)-O-R$

| R | Weight of polymer on fabric, percent | Water repellency |
|---|---|---|
| $-CF(CF_3)_2$ | 5.6 | 100 |
| $-CF(CF_3)_2$ | 1.4 | 100 |
| $-CF(CF_3)_2$ | 0.35 | 100 |
| $-CF(CF_3)(CF_2Cl)$ | 7.0 | 100 |
| Same as above | 2.0 | 100 |
| Do | 1.0 | 100 |
| $-CF(CF_2Cl)_2$ | 5.0 | 100 |
| $-CF(CF_2Cl)_2$ | 1.3 | 100 |
| $-CF(CF_2Cl)_2$ | 0.6 | 100 |
| Control (untreated) | 0 | 50-60 |

EXAMPLE 21

Oil- and Water-Repellency of $$\text{Polymer of } CH_2=C(CH_3)-C(O)-OCH_2CH_2-O-C(O)-O-CF(CF_3)_2$$

The polymer solution prepared as described in Example 17, part B, was diluted further with benzotrifluoride to prepare solutions at several different polymer concentrations. These solutions were applied to wool cloth by immersing the cloth in the solution, pressing to about 100% wet pick-up and curing in an oven at 110° C. for 20 minutes. The results of oil- and water-repellency tests on the products are tabulated below:

| Weight of polymer on fabric, percent | Oil repellency | Water repellency |
|---|---|---|
| 6.4 | 90 | 100 |
| 3.2 | 60 | 100 |
| 1.6 | 50 | 100 |
| None (control) | 0 | 50-60 |

EXAMPLE 22

In situ polymerization of heptafluoroisopropyl acrylate on wool

A swatch of wool flannel was immersed in a 0.2% aqueous solution of ferrous sulphate, squeezed, and dried. The wool was then immersed for one hour in a solution (at 95–100° C.) containing 200 ml. water, 10 ml. heptafluoroisopropyl acrylate, and 0.03% hydrogen peroxide. The swatch was then washed in water, dried, and weighed to determine the polymer uptake. In this case the fabric had a 20% increase in weight.

EXAMPLE 23

Co-polymerization of heptafluoroisopropyl acrylate with n-butyl acrylate

Into a 4-oz. screw top vial were placed 4 g. heptafluoroisopropyl acrylate
4 g. n-butyl acrylate
50 mg. α,α'-azobisisobutyronitrile The vial was closed and heated for 2 hours at 78° C. The copolymer was obtained as a soft, rubbery solid which was soluble in benzotrifluoride and mixtures of ethyl acetate/benzotrifluoride. It had an inherent viscosity of 0.9 in benzotrifluoride at 25° C.

EXAMPLE 24

Preparation and isolation of cesium heptafluoroisopropylate

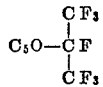

Into a dry, 3-neck, round-bottom flask with attached Dry-Ice condenser were placed 17.4 g. cesium fluoride and 25 cc. tetrahydrofuran. The dispersion was stirred, cooled in an ice bath (about 5° C.), and 19 g. of hexafluoroacetone was introduced. After about 10 minutes the alcoholate had formed as evidenced by the disappearance of $C_5F$. The flask was then connected to a vacuum system and the tetrahydrofuran was removed at room temperature under 0.1 mm. vacuum. The white, powdery, solid product (cesium heptafluoroisopropylate) remained. Unlike many alcoholates, it did not appear to be hygroscopic. It was soluble in such solvents as acetone, N,N-dimethylformamide, and diglyme but insoluble in such non-polar solvents as n-heptane and chloroform. It appeared to be thermally stable up to about 90–100° C. At higher temperatures it melted with decomposition, evolving hexafluoroacetone.

Having thus described the invention, we claim:

1. The process which comprises reacting a ketone of the structure

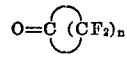

where $n$ is a number from 3 to 10, with an alkali metal fluoride under anhydrous conditions at a temperature up to about 35% C. in a system wherein the sole reactants are the said ketone and alkali metal fluoride, to produce an alkali metal fluorocarbinolate of the structure

wherein M is an alkali metal and $n$ is as defined above, and recovering said alkali metal fluorocarbinolate.

2. An alkali metal fluorocarbinolate of the structure

wherein M is an alkali metal and $n$ is a number from 3 to 10.

References Cited
UNITED STATES PATENTS

| | | | |
|---|---|---|---|
| 3,274,239 | 9/1966 | Selman | 260—514 |
| 3,317,616 | 5/1967 | Weinmayr | 260—633 |
| 3,384,628 | 5/1968 | Pittman et al. | 260—89.5 |

HOWARD T. MARS, Primary Examiner